United States Patent
Guo et al.

(10) Patent No.: US 9,156,976 B2
(45) Date of Patent: Oct. 13, 2015

(54) MULTI-STAGE POLYMER COMPOSITION AND FILMS AND POLARIZER PLATES MADE THEREFROM

(75) Inventors: Hailan Guo, Warrington, PA (US); Veera Nelliappan, North Wales, PA (US); Eric G. Lundquist, North Wales, PA (US)

(73) Assignee: Rohm and Haas Company, Philadelphia, PA (US)

(*) Notice: Subject to any disclaimer, the term of this patent is extended or adjusted under 35 U.S.C. 154(b) by 45 days.

(21) Appl. No.: 14/111,574

(22) PCT Filed: Aug. 14, 2012

(86) PCT No.: PCT/US2012/050731
§ 371 (c)(1),
(2), (4) Date: Mar. 18, 2014

(87) PCT Pub. No.: WO2013/028403
PCT Pub. Date: Feb. 28, 2013

(65) Prior Publication Data
US 2014/0205825 A1    Jul. 24, 2014

Related U.S. Application Data

(60) Provisional application No. 61/526,339, filed on Aug. 23, 2011.

(51) Int. Cl.
*C08L 33/12* (2006.01)
*C08F 2/00* (2006.01)
(Continued)

(52) U.S. Cl.
CPC ............ *C08L 33/12* (2013.01); *C08F 2/001* (2013.01); *C08F 220/14* (2013.01); *C08F 285/00* (2013.01); *G02B 1/04* (2013.01); *C08F 2220/1808* (2013.01); *Y10T 428/2998* (2015.01)

(58) Field of Classification Search
USPC .................................................. 428/220, 407
See application file for complete search history.

(56) References Cited

U.S. PATENT DOCUMENTS 3,562,235 A * 2/1971 Ryan ........................... 428/220
4,141,935 A * 2/1979 Dunkelberger ............... 428/220
(Continued)

FOREIGN PATENT DOCUMENTS

EP    000362    8/1979
EP    1092736    4/2001
(Continued)

OTHER PUBLICATIONS

A.R. Katritzky, et al., Correlation and Prediction of the Refractive Indices of Polymers by QSPR., Jour. of Chem. Info. and Modeling, vol. 38, No. 6 (Nov. 23, 1998), pp. 1171-1176.
(Continued)

*Primary Examiner* — Tahseen N Khan (57) ABSTRACT

A multi-stage polymer composition comprising a crosslinked core component, one or more intermediate layer components and an outermost layer component in which the refractive index of each of the crosslinked core, the one or more intermediate layers and the outermost layer are within 2% of the refractive index of each adjacent component; wherein the crosslinked core component comprises from 75 to 99.9 weight percent of units derived from at least one first monomer selected from the group consisting of alkyl, aryl, and cycloalkyl (meth)acrylate monomer, optionally from 1 to 20 weight percent of units derived from a second monomer selected from the group consisting vinyl monomers; and from 0.1 to 5 weight percent of units derived from cross-linking monomers, graft-linking monomers, or combination thereof, and has a Tg of from −75 to −35° C.; wherein each of the one or more intermediate layer components comprises from 71 to 99.9 weight percent of units derived from a third monomer selected from the group consisting alkyl, aryl and cycloalkyl (meth)acrylate monomers, from 0 to 5 weight percent of units derived from a cross-linking monomer, graft-linking monomer, or combination thereof, optionally from 1 to 10 weight percent of units derived from one or more functional monomers, from 0 to 14 weight percent of vinyl monomers, and has a Tg of from −35 to 100° C.; and wherein the outermost layer component comprises from 90 to 100 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C. is provided. Films and polarizer plates made from the compositions are also provided.

13 Claims, 3 Drawing Sheets

(51) Int. Cl.
*C08F 220/14* (2006.01)
*C08F 285/00* (2006.01)
*G02B 1/04* (2006.01)
*C08F 220/18* (2006.01)

(56) References Cited

U.S. PATENT DOCUMENTS

| | | | | |
|---|---|---|---|---|
| 4,427,836 | A | * | 1/1984 | Kowalski et al. ............ 525/301 |
| 4,469,825 | A | * | 9/1984 | Kowalski et al. ............ 523/201 |
| 4,594,363 | A | * | 6/1986 | Blankenship et al. ......... 521/64 |
| 5,270,397 | A | * | 12/1993 | Rhein et al. ................. 525/309 |
| 5,521,253 | A | * | 5/1996 | Lee et al. .................... 525/301 |
| 2007/0243364 | A1 | * | 10/2007 | Maekawa et al. ............ 428/220 |
| 2010/0002298 | A1 | * | 1/2010 | Sugino et al. ............... 359/485 |

FOREIGN PATENT DOCUMENTS

| | | |
|---|---|---|
| GB | 2039496 | 8/1980 |
| WO | WO2010/116830 | 10/2010 |

OTHER PUBLICATIONS

S. Djekhara, et al., "Batch Emulsion Copolymers Styrene with Ethyl Acrylate: Microstructure and Glass Transition Temperature," Eur. Polym. J., vol. 26, No. 9, pp. 1017-1025, 1990.
PCT Search Report dated Oct. 25, 2012; from PCT counterpart Application No. PCT/US2012/050731.
Instructions to EP Office Action dated Jun. 24, 2014; from EP counterpart Application No. 12750676.4.
Response to EP Office Action dated Jul. 2, 2014; from EP counterpart Application No. 12750676.4.

* cited by examiner

MULTI-STAGE POLYMER COMPOSITION AND FILMS AND POLARIZER PLATES MADE THEREFROM

FIELD OF INVENTION

The instant invention relates to a multi-stage polymer composition and films and polarizers made therefrom.

BACKGROUND OF THE INVENTION

Liquid crystal display (LCD) televisions and monitors utilize polarizer plates containing polarizer protective films. Polarizer films for LCD televisions and monitors typically contain one layer of doped polyvinyl alcohol (PVA). The doped PVA layer is typically protected by two layers of triacetyl cellulose (TAC). Key performance attributes of the polarizer protective film include high total light transmission, low haze, thermal stability and low birefringence. TAC films are traditionally produced by solvent casting methods that are expensive, suffer from low production rates and involve the use of hazardous solvents. Recently, polycyclic olefin films produced by extrusion processes have been used to replace TAC film in polarizer protective film applications. Similarly, polymethylmethacrylate films due to their high light transmission levels and stability have also been evaluated. Unfortunately, the brittle nature of these acrylic films and inability to achieve low birefringence has limited their utilization in polarizer plate and similar applications.

The present invention provides an acrylic film with built-in core/multilayer morphology having similar or better optical performance (high total light transmission, low haze, and low birefringence) as compared to the TAC film product. Such inventive films utilize an inventive polymer composition which provides processing advantages, e.g., melt extrusion in lieu of solvent casting.

SUMMARY OF THE INVENTION

The instant invention is a multi-stage polymer composition and films and polarizer made therefrom.

In one embodiment, the instant invention provides a multi-stage polymer composition comprising: a crosslinked core component, one or more intermediate layer components and an outermost layer component in which the refractive index of each of the crosslinked core, the one or more intermediate layers and the outermost layer are within 2% of the refractive index of each adjacent component; wherein the crosslinked core component comprises greater than 80 weight percent of units derived from at least one first monomer selected from the group consisting of alkyl, aryl, and cycloalkyl (meth)acrylate monomers, optionally from 1 to 20 weight percent of units derived from a second monomer selected from the group consisting of vinyl monomers, from 0.1 to 5 weight percent of units derived from a cross-linking monomer, graft-linking monomer, or combination thereof, and has a glass transition temperature, Tg, of from −75 to −35° C.; wherein each of the one or more intermediate layer components comprises 85 to 99.9 weight percent of units derived from a third monomer selected from the group consisting of alkyl, aryl and cycloalkyl (meth)acrylate monomers; from 0.1 to 5 weight percent of units derived from a cross-linking monomer, graft-linking monomer, or combination thereof, optionally from 1 to 10 weight percent of units derived from one or more functional monomers, and from 0 to 14% of other vinyl monomers and has a Tg of from −35 to 100° C.; and wherein the outermost layer component comprises less than 95 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C.

In an alternative embodiment, the instant invention further provides a film comprising one or more inventive multi-stage polymer compositions.

In another alternative embodiment, the instant invention further provides a polarizer protective film comprising one or more inventive multi-stage polymer compositions.

In an alternative embodiment, the instant invention further provides a multi-layered film comprising a first layer which comprises one or more of the inventive multi-stage polymer compositions and a second layer.

In an alternative embodiment, the instant invention further provides a polarizer plate comprising one or more of the inventive films.

In an alternative embodiment, the instant invention provides a multi-stage polymer composition, film, polarizer protective film, multi-layered film and polarizer plate, in accordance with any of the preceding embodiments, except that each of the crosslinked core component, the one or more intermediate layer components, and the outermost layer component have a refractive index in the range from 1.46 to 1.53.

In an alternative embodiment, the instant invention provides a multi-stage polymer composition, film, polarizer protective film, multi-layered film and polarizer plate, in accordance with any of the preceding embodiments, except that the multi-stage polymer composition comprises from 10 to 30 percent by weight of the crosslinked core component, from 10 to 30 percent by weight of the total amount of the one or more intermediate layer components, and from 40 to 80 percent by weight of the outermost layer component, based on the total weight of the multi-stage polymer.

In an alternative embodiment, the instant invention provides a multi-stage polymer composition, film, polarizer protective film, multi-layered film and polarizer plate, in accordance with any of the preceding embodiments, except that the first monomer is selected from the group consisting of butyl acrylate, ethyl hexyl acrylate, ethyl acrylate, methyl methacrylate, cyclohexyl (meth)acrylate, cyclopentyl methacrylate, tetrahydrofurfyl methacrylate, benzyl acrylate, benzyl methacrylate, phenyl acrylate, and phenyl methacrylate.

In an alternative embodiment, the instant invention provides a multi-stage polymer composition, film, polarizer protective film, multi-layered film and polarizer plate, in accordance with any of the preceding embodiments, except that the second monomer is selected from the group of vinyl monomers consisting of styrene, substituted styrene and alpha methyl styrene.

In an alternative embodiment, the instant invention provides a multi-stage polymer composition, film, polarizer protective film, multi-layered film and polarizer plate, in accordance with any of the preceding embodiments, except that the cross-linking monomer is selected from the group consisting of butanediol di(meth)acrylate, trimethyolpropanetri(meth)acrylate, ethylene glycol di(meth)acrylate, diethylene glycol di(meth)acrylate, divinyl benzene, and combinations thereof.

In an alternative embodiment, the instant invention provides a multi-stage polymer composition, film, polarizer protective film, multi-layered film and polarizer plate, in accordance with any of the preceding embodiments, except that the graft-linking monomer is selected from the group consisting of allyl methacrylate, diallyl maleate, and combinations thereof.

In an alternative embodiment, the instant invention provides a multi-stage polymer composition, film, polarizer protective film, multi-layered film and polarizer plate, in accordance with any of the preceding embodiments, except that the core component and an adjacent intermediate layer component are formed by emulsion polymerization and form latex particles having a size less than 500 nm.

In an alternative embodiment, the instant invention provides a multi-stage polymer composition, film, polarizer protective film, multi-layered film and polarizer plate, in accordance with any of the preceding embodiments, except that the core component, the one or more intermediate layer components and the outermost layer component are formed by emulsion polymerization.

In an alternative embodiment, the instant invention provides a multi-stage polymer composition, film, polarizer protective film, multi-layered film and polarizer plate, in accordance with any of the preceding embodiments, except that the outermost layer component has a weight average molecular weight less than 500,000 g/mole.

In an alternative embodiment, the instant invention provides a multi-stage polymer composition, film, polarizer protective film, multi-layered film and polarizer plate, in accordance with any of the preceding embodiments, except that the functional monomers comprise functional groups selected from the group consisting of acid, amino, glycidyl, oxirane, and hydroxyl functional groups. Examples of functional monomers include but are not limited to glycidyl methacrylate, hydroxyethyl methacrylate, hydroxypropyl(meth)acrylate, (meth)acrylic acid, (meth)acrylamide, hydroxybutyl (methacrylate).

In an alternative embodiment, the instant invention provides a multi-stage polymer composition, film, polarizer protective film, multi-layered film and polarizer plate, in accordance with any of the preceding embodiments, except that the one or more of the intermediate layer components have a gradient composition such that the Tg transitions from −30° C. to 20° C. over the width of the intermediate layer components.

In an alternative embodiment, the instant invention provides a multi-stage polymer composition, film, polarizer protective film, multi-layered film and polarizer plate, in accordance with any of the preceding embodiments, except that the film exhibits in-plane retardation, And, of less than 3 nm and a thickness direction retardation, Rth, of less than 50 nm.

In an alternative embodiment, the instant invention provides a multi-stage polymer composition, film, polarizer protective film, multi-layered film and polarizer plate, in accordance with any of the preceding embodiments, except that the film has a thickness of from 30 to 150 microns.

In an alternative embodiment, the instant invention provides a multi-stage polymer composition, film, polarizer protective film, multi-layered film and polarizer plate, in accordance with any of the preceding embodiments, except that the film has a thickness of from 60 to 80 microns.

In an alternative embodiment, the instant invention provides a multi-stage polymer composition, film, polarizer protective film, multi-layered film and polarizer plate, in accordance with any of the preceding embodiments, except that the film has a haze level of less than 1.5% as measured according to ASTM D871-96 (2010).

In an alternative embodiment, the instant invention provides a multi-stage polymer composition, film, polarizer protective film, multi-layered film and polarizer plate, in accordance with any of the preceding embodiments, except that the film has a haze level of less than 1.0% as measured according to ASTM D871-96 (2010).

In an alternative embodiment, the instant invention provides a multi-stage polymer composition, film, polarizer protective film, multi-layered film and polarizer plate, in accordance with any of the preceding embodiments, except that the film has a haze level of less than 0.6% as measured according to ASTM D871-96 (2010).

In an alternative embodiment, the instant invention provides a multi-stage polymer composition, film, polarizer protective film, multi-layered film and polarizer plate, in accordance with any of the preceding embodiments, except that second layer of the multi-layered film comprises a polyvinyl alcohol.

In an alternative embodiment, the instant invention provides a multi-stage polymer composition, film, polarizer protective film, multi-layered film and polarizer plate, in accordance with any of the preceding embodiments, except that second layer of the multi-layered film comprises cellulose triacetate.

In an alternative embodiment, the instant invention provides a multi-stage polymer composition, film, polarizer protective film, multi-layered film and polarizer plate, in accordance with any of the preceding embodiments, except that the multi-layered film is prepared by a melt process. Exemplary melt processes useful in some embodiments of the invention include, but are not limited to calendaring, cast extrusion, blow extrusion, injection molding or coextrusion processes.

In another alternative embodiment, the instant invention provides a multi-stage polymer composition consisting essentially of: a crosslinked core component, one or more intermediate layer components and an outermost layer component in which the refractive index of each of the crosslinked core, the one or more intermediate layers and the outermost layer are within 2% of the refractive index of each adjacent component; wherein the crosslinked core component comprises greater than 80 weight percent of units derived from at least one first monomer selected from the group consisting of alkyl, aryl, and cycloalkyl (meth)acrylate monomers, optionally from 1 to 20 weight percent of units derived from a second monomer selected from the group consisting of vinyl monomers, from 0.1 to 5 weight percent of units derived from a cross-linking monomer graft-linking monomer, or combination thereof, and has a Tg of from −75 to −35° C.; wherein each of the one or more intermediate layer components comprises 85 to 99.9 weight percent of units derived from a third monomer selected from the group consisting of alkyl and cycloalkyl (meth)acrylate monomers; from 0.1 to 5 weight percent of units derived from a cross-linking monomer, graft-linking monomer, or combination thereof, optionally from 1 to 10 weight percent of units derived from one or more functional monomers, and from 0 to 14% of other vinyl monomers and has a Tg of from −35 to 20° C.; and wherein the outermost layer component comprises less than 95 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C.

In yet another alternative embodiment, the instant invention further provides a film consisting essentially of one or more inventive multi-stage polymer compositions.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention is a multi-stage polymer composition and films and polarizer plates made therefrom.

The multi-stage polymer composition of the present invention comprises: (a) a crosslinked core component, (b) one or more intermediate layer components; and (c) an outermost layer component wherein the refractive index of the crosslinked core, the one or more intermediate layers and the outermost layer are within 2% of each adjacent component; wherein the crosslinked core component comprises from 75 to 99.9 weight percent of units derived from at least one first monomer selected from the group consisting of alkyl, aryl, and cycloalkyl (meth)acrylate monomer, optionally from 1 to 20 weight percent of units derived from a second monomer selected from the group consisting vinyl monomers; and from 0.1 to 5 weight percent of units derived from cross-linking, graft-linking monomers, or combination thereof, and has a Tg of from −75 to −35° C.; wherein each of the one or more intermediate layer components comprises from 71 to 99.9 weight percent of units derived from a third monomer selected from the group consisting alkyl, aryl and cycloalkyl (meth)acrylate monomers, from 0.1 to 5 weight percent of units derived from a cross-linking monomer, graft-linking monomer, or combination thereof, optionally from 1 to 10 weight percent of units derived from one or more functional monomers, from 0 to 14 weight percent of vinyl monomers, and has a Tg of from −35 to 20° C.; and wherein the outermost layer component comprises at least 90 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C.

As used herein, the term "(meth)acrylate" means acrylate or methacrylate.

As used herein the term "within 2% of each adjacent component" means that the refractive index of adjacent components do not differ by more than 2% based upon the larger refractive index of the adjacent components. For example, an inventive multi-stage polymer composition may have a crosslinked core component, a first intermediate layer component, a second intermediate layer component and an outermost layer component. In such instance, the crosslinked core component has a refractive index within 2% of the refractive index of the first intermediate layer component wherein the 2% is calculated based upon the larger of the refractive index of the core component and the refractive index of the first intermediate layer component. Likewise, the outermost layer component has a refractive index within 2% of the second intermediate layer component based upon the larger of the refractive index of the outermost layer component and the refractive index of the second intermediate layer component. Similarly, the refractive index of the first intermediate layer component is within 2% of the refractive index of the second intermediate layer component based on the larger of the refractive index of the first intermediate layer component and the refractive index of the second intermediate layer component. All individual values and sub-ranges from within 2% are included herein and disclosed herein; for example, the refractive indices of adjacent components can be from an upper limit of 2, 1.8, 1.6, 1.5, 1, 4, 1, 2, 1, 0.9, 0.6, 0.5, 0.4, 0.2 or 0.1%. For example, the refractive indices of adjacent components may differ by no more than 2%, or in the alternative, the refractive indices of adjacent components may differ by no more than 1.8%, or in the alternative, the refractive indices of adjacent components may differ by no more than 1.6%, or in the alternative, the refractive indices of adjacent components may differ by no more than 1.4%, or in the alternative, the refractive indices of adjacent components may differ by no more than 1.2%, or in the alternative, the refractive indices of adjacent components may differ by no more than 0.8%.

The crosslinked core component comprises 75 to 99.9 weight percent of units derived from a first monomer based on the total weight of the crosslinked core component. All individual values and sub-ranges from 75 to 99.9 weight percent are included herein and disclosed herein; for example, the weight percent of units derived from a first monomer in the crosslinked core can be from a lower limit of 75, 81, 84, 88, 92, 96, 98 or 99 weight percent to an upper limit of 76, 81, 84, 88, 92, 96, 98, 99, or 99.9 weight percent. For example, the amount of units derived from a first monomer in the crosslinked core may be in the range of from 75 to 99.9 weight percent, or in the alternative, the amount of units derived from a first monomer in the crosslinked core may be in the range of from 80 to 90 weight percent, or in the alternative, the amount of units derived from a first monomer in the crosslinked core may be in the range of from 85 to 99.9 weight percent.

The first monomer useful in forming the crosslinked core of the inventive compositions is selected from the group consisting of alkyl, aryl and cycloalkyl (meth)acrylate monomers, and combinations thereof. Exemplary first monomers include, but are not limited to, butyl acrylate, ethyl hexyl acrylate, ethyl acrylate, methyl methacrylate, butyl methacrylate, cyclohexyl (meth)acrylate, cyclopentyl (meth)acrylate, tetrahydrofurylmethacrylate, benzyl acrylate, benzyl methacrylate, phenyl acrylate, phenyl methacrylate, and combinations thereof. In one specific embodiment of the inventive composition, the first monomer is a combination of butyl acrylate and benzyl acrylate.

The crosslinked core further comprises from 0.1 to 5 weight percent of units derived from a cross-linking monomer, graft-linking monomer, or combination thereof, based upon the total weight of the crosslinked core. All individual values and sub-ranges from 0.1 to 5 weight percent are included herein and disclosed herein; for example, the amount of units derived from a cross-linking monomer, graft linking monomer, or combination thereof, can be from a lower limit of 0.1, 0.5, 1, 1.5, 2, 2.5, 3, 3.5, 4 or 4.5 weight percent to an upper limit of 0.5, 1, 1.5, 2, 2.5, 3, 3.5, 4, 4.5, or 5 weight percent. For example, the amount of units derived from a cross-linking monomer graft-linking monomer, or combination thereof, may be in the range of from 0.1 to 5 weight percent, or in the alternative, the amount of units derived from a cross-linking monomer, graft-linking monomer, or combination thereof, may be in the range of from 1.5 to 4.5 weight percent, or in the alternative, the amount of units derived from a cross-linking monomer, graft-linking monomer, or combination thereof, may be in the range of from 2 to 4 weight percent, or in the alternative, the amount of units derived from a cross-linking monomer, graft-linking monomer, or combination thereof, may be in the range of from 3.5 to 5 weight percent.

Cross-linking monomers useful in some embodiments of the inventive composition are selected from the group consisting of butanediol di(meth)acrylate, ethylene glycol di(meth)acrylate, divinyl benzene, diethylene glycol di(meth)acrylate blends thereof and combinations thereof. In alternative embodiments of the inventive composition, the cross-linking monomers may include, but not limited to trimethyolpropane triacrylate, butylene glycol dimethacrylate (BGDMA), trimethyolpropane trimethacrylate, blends thereof, and combinations thereof.

Graft-linking monomers useful in embodiments of the inventive composition are selected from the group consisting of allyl methacrylate, diallyl maleate, blends thereof and combinations thereof.

Embodiments of the crosslinked core may optionally comprise from 1 to 20 weight percent of units derived from a second monomer based on the total weigh of the crosslinked core. All individual values and sub-ranges from 1 to 20 weight percent are included herein and disclosed herein; for example, the amount of units derived from a second monomer can be from a lower limit of 1, 5, 7.5, 10, 13, 16, or 19 weight percent to an upper limit of 1.5, 4, 6, 10, 14, 17, or 20 weight percent. For example, the amount of units derived from a second monomer may be in the range of from 1 to 20 weight percent, or in the alternative, the amount of units derived from a second monomer may be in the range of from 5 to 14.5 weight percent, or in the alternative, the amount of units derived from a second monomer may be in the range of from 10 to 18 weight percent, or in the alternative, the amount of units derived from a second monomer may be in the range of from 15 to 20 weight percent.

Second monomers useful in forming the crosslinked core in some embodiments of the inventive composition are selected from the group consisting of vinyl-containing monomers. Exemplary second monomers include, but are not limited to styrene, substituted styrene, alpha-methyl styrene, and combinations thereof.

The crosslinked core of embodiments of the inventive composition has a glass transition temperature, Tg, of from −75 to −35° C. All individual values and sub-ranges from −75 to −35° C. are included herein and disclosed herein; for example, the Tg of the crosslinked core can be from a lower limit of −75, −70, −65, −60, −55, −50, −45, or −40° C. to an upper limit of −70, −65, −60, −55, −50, −45, −40, or −35° C. For example, the Tg of the crosslinked core may be in the range of from −75 to −35° C., or in the alternative, the Tg of the crosslinked core may be in the range of from −65 to −45° C., or in the alternative, the Tg of the crosslinked core may be in the range of from −50 to −60° C.

Embodiments of the inventive multi-stage polymer compositions may comprise one or more intermediate layers. In some embodiments, the inventive multi-stage polymer composition comprises one intermediate layer. In alternative embodiments, the inventive multi-stage polymer composition comprises two intermediate layers. In yet other embodiments, the inventive multi-stage polymer composition comprises three or more intermediate layers.

Each of the one or more intermediate layer components comprises from 71 to 99.9 weight percent of units derived from a third monomer based on the total weight of each intermediate layer. All individual values and sub-ranges from 71 to 99.9 weight percent are included herein and disclosed herein; for example, the weight percent of units derived from a third monomer in each intermediate layer component can be from a lower limit of 71, 75, 79, 84, 86, 88, 90, 92, 96, 98 or 99 weight percent to an upper limit of 72, 76, 80, 83, 86, 88, 90, 92, 96, 98, 99, or 99.9 weight percent. For example, the amount of units derived from a third monomer in each intermediate layer may be in the range of from 71 to 99.9 weight percent, or in the alternative, the amount of units derived from a third monomer in each intermediate layer may be in the range of from 82 to 98 weight percent, or in the alternative, the amount of units derived from a third monomer in each intermediate layer may be in the range of from 90 to 99 weight percent.

Third monomers useful in forming each intermediate layer are selected from the group consisting alkyl, aryl and cycloalkyl (meth)acrylate monomers. Exemplary third monomers include, but not limited to, butyl acrylate, ethyl hexyl acrylate, ethyl acrylate, methyl methacrylate, cyclohexyl methacrylate, cyclopentyl methacrylate, tetrahydrofuryl methacrylate, benzyl acrylate, benzyl methacrylate, phenyl acrylate, phenyl methacrylate, and combinations thereof.

Each intermediate layer further comprises from 0.1 to 5 weight percent of units derived from a cross-linking monomer, graft-linking monomer, or combination thereof, based on the total weigh of the intermediate layer. All individual values and sub-ranges from 0.1 to 5 weight percent are included herein and disclosed herein; for example, the amount of units derived from a cross-linking monomer, graft-linking monomer, or combination thereof, in each intermediate layer can be from a lower limit of 0.1, 0.5, 1, 1.5, 2, 2.5, 3, 3.5, 4 or 4.5 weight percent to an upper limit of 0.5, 1, 1.5, 2, 2.5, 3, 3.5, 4, 4.5, or 5 weight percent. For example, the amount of units derived from a cross-linking monomer, graft-linking monomer, or combination thereof, may be in the range of from 0.1 to 5 weight percent, or in the alternative, the amount of units derived from a cross-linking monomer, graft-linking monomer, or combination thereof, may be in the range of from 1.5 to 4.5 weight percent, or in the alternative, the amount of units derived from a cross-linking monomer, graft-linking monomer, or combination thereof, may be in the range of from 2 to 4 weight percent, or in the alternative, the amount of units derived from a cross-linking monomer, graft-linking monomer, or combination thereof, may be in the range of from 3.5 to 5 weight percent.

Each of the one or more intermediate layer components may optionally comprise from 1 to 10 weight percent of units derived from one or more functional monomers. All individual values and sub-ranges from 1 to 10 weight percent are included herein and disclosed herein; for example, the amount of units derived from one or more functional monomers in each intermediate layer can be from a lower limit of 1, 2.2, 3, 4.6, 6, 7, 8.1, 9, or 9.8 weight percent to an upper limit of 1.1, 2, 3.3, 4.6, 5, 6, 7.3, 8.8, 9, or 10 weight percent. For example, the amount of units derived from one or more functional monomers may be in the range of from 1 to 10 weight percent, or in the alternative, the amount of units derived from one or more functional monomers may be in the range of from 3 to 7 weight percent.

Each of the one or more intermediate layer components may comprise from 0 to 14 weight percent of units derived from one or more vinyl monomers. All individual values and sub-ranges from 0 to 14 weight percent are included herein and disclosed herein; for example, the amount of units derived from one or more vinyl monomers in each intermediate layer can be from a lower limit of 0, 1, 2, 3, 4, 6, 8.1, 10, 12, or 13 weight percent to an upper limit of 1, 3, 5, 6, 8, 9, 12, or 14 weight percent. For example, the amount of units derived from one or more vinyl monomers may be in the range of from 0 to 14 weight percent, or in the alternative, the amount of units derived from one or more vinyl monomers may be in the range of from 3 to 12 weight percent.

Each of the one or more intermediate layer components has a Tg of from −35 to 100° C. All individual values and sub-ranges from −35 to 100° C. are included herein and disclosed herein; for example, the Tg of each of the one or more intermediate layer components can be from a lower limit of −35, −25, −15, −5, 5, 15, 25, 35, 45, 55, 65, 75, 85 or 95° C. to an upper limit of −25, −15, −5, 5, 15, 25, 35, 45, 55, 65, 75, 85, 95 or 100° C. For example, the Tg of each of the one or more intermediate layer components may be in the range of from −35 to 100° C., or in the alternative, the Tg of each of the one or more intermediate layer components may be in the range of from −20 to 75° C., or in the alternative, the Tg of each of the one or more intermediate layer components may be in the range of from −5 to 55° C.

Figure 1:
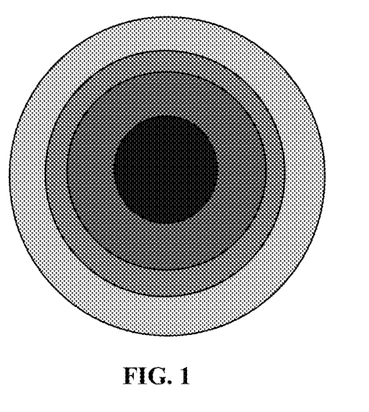
FIG. 1 is a cross sectional schematic illustrating one embodiment of the multi-stage polymer composition of the invention, wherein the intermediate layer components each exhibits a distinct Tg.

FIG. 1 schematically depicts a cross section of core/multilayer polymer structure of an embodiment of the invention wherein each intermediate layer component has a distinct composition and therefore, a distinct Tg, based upon a substantially sharp transition in composition between each of the intermediate layer components. In FIG. 1, the black center circle represents the core component, the darkest gray circle represents a first intermediate layer component, the medium gray circle represents a second intermediate layer component and the lightest gray circle represents an outermost layer component. As depicted in FIG. 1, the composition of each intermediate layer component distinctly changes at the boundary of each intermediate layer component with the adjacent intermediate layer components.

Figure 2:
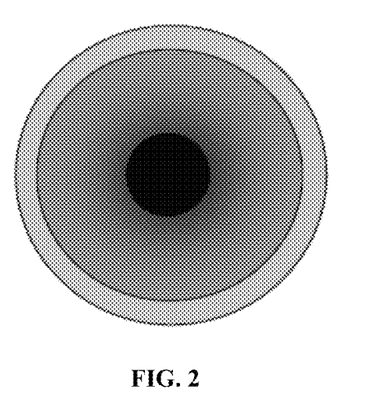
FIG. 2 is a cross sectional schematic illustrating an alternative embodiment of the multi-stage polymer composition of the invention, wherein the intermediate layer components exhibit a gradient Tg.
Figure 3:
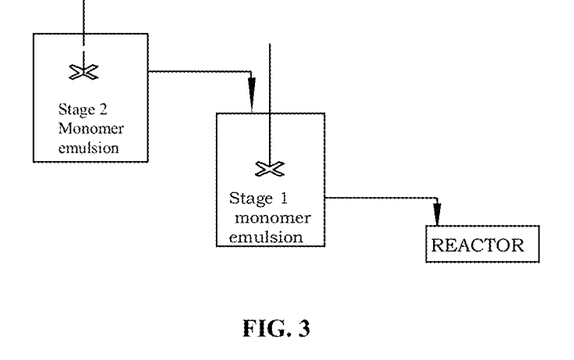
FIG. 3 is a schematic illustrating one method for making the multi-stage polymer composition.

In an alternative embodiment, each of the two or more intermediate layer components may be synthesized such that the compositional change amongst the intermediate layer components changes gradually. In such embodiments, the intermediate layer components do not exhibit distinct Tg (as measured by DSC). That is, the composition of the first intermediate layer gradually transitions to the second intermediate layer composition, and the composition of the second intermediate layer gradually transitions to the third intermediate layer composition, and so on. Therefore, instead of a fixed Tg for each intermediate layer, there may be a continuous Tg gradient through the entire intermediate layer(s). This embodiment is depicted in the cross sectional schematic view of FIG. 2 with the gradient shading in the zone of the intermediate layer components. In FIG. 2, the black circle represents the core and the light gray outer circle represents the outermost layer.

The outermost layer component of the inventive compositions comprises from 90 to 100 weight percent units derived from a fourth monomer selected from the group consisting of alkyl (meth)acrylate monomers having from one to twelve carbon atoms. All individual values and sub-ranges from 90 to 100 weight percent are included herein and disclosed herein; for example, the amount of units derived from a fourth monomer in the outermost layer component can be from a lower limit of 90, 91, 92, 93, 94, 95, 96, 97, 98, or 99 weight percent to an upper limit of 91, 92, 93, 94, 95, 96, 97, 98, 99, or 100 weight percent. For example, the amount of units derived from a fourth monomer in the outermost layer component may be in the range of from 90 to 100 weight percent, or in the alternative, the amount of units derived from a fourth monomer in the outermost layer component may be in the range of from 94 to 98 weight percent.

The outermost layer of the inventive composition may optionally comprise from 0.5 to 10 weight percent of units derived from one or more functional monomers. All individual values and sub-ranges from 0.5 to 10 weight percent are included herein and disclosed herein; for example, the amount of units derived from one or more functional monomers can be from a lower limit of 0.5, 1, 2, 3, 4, 5, 6, 7, 8, or 9 weight percent to an upper limit of 2, 3, 4, 5, 6, 7, 8, 9, or 10 weight percent. For example, the amount of units derived from one or more functional monomers may be in the range of from 0.5 to 10 weight percent, or in the alternative, the amount of units derived from one or more functional monomers may be in the range of from 3 to 7 weight percent.

The outermost layer of the inventive composition has a Tg of from 80 to 130° C. All individual values and sub-ranges from 80 to 130° C. are included herein and disclosed herein; for example, the Tg of the outermost layer can be from a lower limit of 80, 90, 100, 110, or 120° C. to an upper limit of 85, 95, 105, 115, 125 or 130° C. For example, the Tg of the outermost layer may be in the range of from 80 to 130° C., or in the alternative, the Tg of the outermost layer may be in the range of from 100 to 125° C.

In some embodiments of the inventive compositions, the crosslinked core component has a refractive index (RI) in the range from 1.46 to 1.53. All individual values and sub-ranges from 1.46 to 1.53 are included herein and disclosed herein; for example, the RI of the crosslinked core can be from a lower limit of 1.46, 1.47, 1.48, 1.49, 1.5, 1.51 or 1.52 to an upper limit of 1.48, 1.49, 1.5, 1.51, 1.52, or 1.53. For example, the RI of the crosslinked core may be in the range of from 1.46 to 1.53, or in the alternative, the RI of the crosslinked core may be in the range of from 1.48 to 1.52.

In some embodiments of the inventive compositions, each of the one or more intermediate layer components has a refractive index (RI) in the range from 1.46 to 1.53. All individual values and sub-ranges from 1.46 to 1.53 are included herein and disclosed herein; for example, the RI of each of the intermediate layers can be from a lower limit of 1.46, 1.47, 1.48, 1.49, 1.5, 1.51 or 1.52 to an upper limit of 1.48, 1.49, 1.5, 1.51, 1.52, or 1.53. For example, the RI of each of the intermediate layers may be in the range of from 1.46 to 1.53, or in the alternative, the RI of each of the intermediate layers may be in the range of from 1.48 to 1.52.

In some embodiments of the inventive compositions, the outermost layer component has a refractive index (RI) in the range from 1.46 to 1.53. All individual values and sub-ranges from 1.46 to 1.53 are included herein and disclosed herein; for example, the RI of the outermost layer can be from a lower limit of 1.46, 1.47, 1.48, 1.49, 1.5, 1.51 or 1.52 to an upper limit of 1.48, 1.49, 1.5, 1.51, 1.52, or 1.53. For example, the RI of the outermost layer may be in the range of from 1.46 to 1.53, or in the alternative, the RI of the outermost layer may be in the range of from 1.48 to 1.52.

In some embodiments of the inventive composition, the crosslinked core component comprises from 10 to 30 weight percent of the total weight of the multi-stage polymer composition. All individual values and sub-ranges from 10 to 30 weight percent are included herein and disclosed herein; for example, the amount of crosslinked core of the total weight of the composition can be from a lower limit of 10, 12.5, 15, 17.5, 20, 22.5, or 25 weight percent to an upper limit of 12.5, 15, 17.5, 20, 22.5, 25, 27.5 or 30 weight percent. For example, the amount of crosslinked core of the total weight of the composition may be in the range of from 10 to 30 weight percent, or in the alternative, the amount of crosslinked core of the total weight of the composition may be in the range of from 15 to 25 weight percent.

In some embodiments of the inventive composition, the total amount of the one or more intermediate layer components comprises from 10 to 30 weight percent of the total weight of the composition. All individual values and sub-ranges from 10 to 30 weight percent are included herein and disclosed herein; for example, the total amount of the one or more intermediate layer components can be from a lower limit of 10, 12.5, 15, 17.5, 20, 22.5, or 25 weight percent to an upper limit of 12.5, 15, 17.5, 20, 22.5, 25, 27.5 or 30 weight percent. For example, the total amount of the one or more intermediate layer components, based on the total weight of the composition, may be in the range of from 10 to 30 weight percent, or in the alternative, the total amount of the one or more intermediate layer components, based on the total weight of the composition, may be in the range of from 15 to 25 weight percent.

In some embodiments of the inventive composition, the outermost layer component comprises from 40 to 80 weight percent of the total weight of the composition. All individual values and sub-ranges from 40 to 80 weight percent are included herein and disclosed herein; for example, the amount of the outermost layer of the total weight of the composition can be from a lower limit of 40, 45, 50, 55, 60, 65, 70, or 75 weight percent to an upper limit of 45, 50, 55, 60, 65, 70, 75, or 80 weight percent. For example, the amount of the outermost layer, based on the total weight of the composition, may be in the range of from 40 to 80 weight percent, or in the alternative, the amount of the outermost layer, based on the total weight of the composition, may be in the range of from 55 to 65 weight percent.

Functional monomers useful in certain embodiments of the inventive composition are derived from the group consisting of acid, amino, oxirane, glycidyl, and hydroxyl functionalities. Examples of functional monomers include but are not limited to glycidyl methacrylate, hydroxyethyl methacrylate, hydroxypropylmethacrylate, hydroxybutyl methacrylate, (meth)acrylic acid, (meth)acrylamide.

In some embodiments of the inventive composition, the core component and one or more intermediate layer components are formed by emulsion polymerization and form latex particles having a size less than 500 nm. All individual values and sub-ranges from an upper limit of less than 500 nm are included herein and disclosed herein; for example, the size of the latex particles can be from an upper limit of less than 500, 575, 550, 525, 500, 475, or 450 nm.

In some embodiments of the inventive composition, the outermost layer component is formed by one or more of solution, suspension and emulsion polymerization processes. The outermost layer component thereby formed may be subsequently melt processed with the latex particles formed by emulsion polymerization of the core component, and the one or more intermediate layer components.

In yet other embodiments of the invention, the core, one or more intermediate layer and outermost layer components are all formed by emulsion polymerization.

The emulsion polymerization processes may be carried out as described in, by way of example and not limitation, the Inventive Examples hereof. The solution polymerization process may be carried out as described in "Principles of Polymerization," Third Edition, G. Odian, Wiley-Interscience, p. 302, the disclosure of which is incorporated herein by reference. The suspension polymerization process may be carried out as described in "Principles of Polymerization," Third Edition, G. Odian, Wiley-Interscience, p. 352, the disclosure of which is incorporated herein by reference.

In some embodiments of the invention, the outermost layer component has a weight average molecular weight less than or equal to 500,000 g/mole. All individual values and sub-ranges from an upper limit of less than 500,000 g/mole are included herein and disclosed herein; for example, the weight average molecular weight of the outermost layer component can be from an upper limit of less than 500,000 g/mole, 450,000 g/mole, 400,000 g/mole or 350,000 g/mole.

In an alternative embodiment, the instant invention further provides a film comprising one or more multi-stage polymer compositions of any one of the embodiments discussed herein.

In certain embodiments of the inventive film, the film exhibits in-plane retardation, And, of less than 5 nm at 633 nm wavelength. All individual values and sub-ranges from less than 5 nm are included herein and disclosed herein; for example, the in-plane retardation of the inventive film can be from an upper limit of less than 5, 3, 2.75, 2.5, 2 or 1 nm.

In certain embodiments of the inventive film, the film exhibits thickness direction retardation, Rth, of less than 50 nm at 633 nm wavelength. All individual values and sub-ranges from less than 50 nm are included herein and disclosed herein; for example, the thickness direction retardation of the inventive film can be from an upper limit of less than 50, 40, 30, 20, 10, or 5 nm.

In some embodiments, the inventive film has a thickness of from 30 to 150 microns. All individual values and sub-ranges from 30 to 150 microns are included herein and disclosed herein; for example, the film thickness can be from a lower limit of 30, 50, 70, 90, 110, 130 or 140 microns to an upper limit of 40, 60, 80, 100, 120, 140 or 150 microns. For example, the film thickness may be in the range of from 30 to 150 microns, or in the alternative, the film thickness may be in the range of from 30 to 90 microns, or in the alternative, the film thickness may be in the range of from 100 to 150 microns, or in the alternative, the film thickness may be in the range of from 60 to 80 microns.

In some embodiments, the inventive film has a haze level of less than 1.5% as measured according to ASTM D871-96 (2010). All individual values and sub-ranges from less than 1.5% are included herein and disclosed herein; for example, the film haze level can be from an upper limit of less than 1.5, 1.3, 1.0, 0.8, 0.6, or 0.4%.

In yet another alternative embodiment, the instant invention further provides a polarizing protective film comprising the multi-stage polymer composition according to any one of embodiments described herein.

In yet another alternative embodiment, the instant invention further provides a polarizer plate comprising the film according to any one of the embodiments described herein.

The terms polarizer plate and polarizing protective film herein have the same meanings as is commonly understood in the art and as are given in, for example, US Patent Application Publication Nos. 20100002298 and 20070243364, the disclosures of which are incorporated herein by reference.

In yet another alternative embodiment, the instant invention further provides a multi-layered film comprising a first layer comprising one or more inventive multi-stage polymer compositions according to any one of the embodiments described herein and a second layer comprising a polyvinyl alcohol. Exemplary polyvinyl alcohols useful in certain embodiments of the invention include, but are not limited to, dye polarized polyvinyl alcohols.

In yet another alternative embodiment, the instant invention further provides a multi-layered film comprising a first layer comprising one or more inventive multi-stage polymer compositions according to any one of the embodiments described herein and a second layer comprising cellulose triacetate.

In certain embodiments of the invention, the multi-layered film is prepared by a melt process. Exemplary melt processes useful in some embodiments of the invention include, but are not limited to calendaring, cast extrusion, blow extrusion, injection molding or coextrusion processes.

In yet another embodiment, the instant invention further provides a multi-stage polymer composition consisting essentially of a crosslinked core component, one or more intermediate layer components and an outermost layer component in which the refractive index of each of the crosslinked core, the one or more intermediate layers and the outermost layer are within 2% of the refractive index of each adjacent component; wherein the crosslinked core component comprises from 75 to 99.9 weight percent of units derived from at least one first monomer selected from the group consisting of alkyl, aryl, and cycloalkyl (meth)acrylate monomer, optionally from 1 to 20 weight percent of units derived from a second monomer selected from the group consisting vinyl monomers; and from 0.1 to 5 weight percent of units derived from cross-linking monomers, graft-linking monomers, or combination thereof, and has a Tg of from −75 to −35° C.; wherein each of the one or more intermediate layer components comprises from 71 to 99.9 weight percent of units derived from a third monomer selected from the group consisting alkyl, aryl and cycloalkyl (meth)acrylate monomers, from 0 to 5 weight percent of units derived from a cross-linking monomer, graft-linking monomer, or combination thereof, optionally from 1 to 10 weight percent of units derived from one or more functional monomers, from 0 to 14 weight percent of vinyl monomers, and has a Tg of from −35 to 100° C.; and wherein the outermost layer component comprises from 90 to 100 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C. is provided. Films and polarizer plates made from the compositions are also provided.

In yet another embodiment, the instant invention further provides a multi-stage polymer composition comprising a crosslinked core component, one or more intermediate layer components and an outermost layer component in which the refractive index of each of the crosslinked core, the one or more intermediate layers and the outermost layer are within 2% of the refractive index of each adjacent component; wherein the crosslinked core component consists essentially of from 75 to 99.9 weight percent of units derived from at least one first monomer selected from the group consisting of alkyl, aryl, and cycloalkyl (meth)acrylate monomer, optionally from 1 to 20 weight percent of units derived from a second monomer selected from the group consisting vinyl monomers; and from 0.1 to 5 weight percent of units derived from cross-linking monomers, graft-linking monomers, or combination thereof, and has a Tg of from −75 to −35° C.; wherein each of the one or more intermediate layer components comprises from 71 to 99.9 weight percent of units derived from a third monomer selected from the group consisting alkyl, aryl and cycloalkyl (meth)acrylate monomers, from 0 to 5 weight percent of units derived from a cross-linking monomer, graft-linking monomer, or combination thereof, optionally from 1 to 10 weight percent of units derived from one or more functional monomers, from 0 to 14 weight percent of vinyl monomers, and has a Tg of from −35 to 100° C.; and wherein the outermost layer component comprises from 90 to 100 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C. is provided. Films and polarizer plates made from the compositions are also provided.

In yet another embodiment, the instant invention further provides a multi-stage polymer composition comprising a crosslinked core component, one or more intermediate layer components and an outermost layer component in which the refractive index of each of the crosslinked core, the one or more intermediate layers and the outermost layer are within 2% of the refractive index of each adjacent component; wherein the crosslinked core component comprises from 75 to 99.9 weight percent of units derived from at least one first monomer selected from the group consisting of alkyl, aryl, and cycloalkyl (meth)acrylate monomer, optionally from 1 to 20 weight percent of units derived from a second monomer selected from the group consisting vinyl monomers; and from 0.1 to 5 weight percent of units derived from cross-linking monomers, graft-linking monomers, or combination thereof, and has a Tg of from −75 to −35° C.; wherein each of the one or more intermediate layer components consists essentially of from 71 to 99.9 weight percent of units derived from a third monomer selected from the group consisting alkyl, aryl and cycloalkyl (meth)acrylate monomers, from 0 to 5 weight percent of units derived from a cross-linking monomer, graft-linking monomer, or combination thereof, optionally from 1 to 10 weight percent of units derived from one or more functional monomers, from 0 to 14 weight percent of vinyl monomers, and has a Tg of from −35 to 100° C.; and wherein the outermost layer component comprises from 90 to 100 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C. is provided. Films and polarizer plates made from the compositions are also provided.

In yet another embodiment, the instant invention further provides a multi-stage polymer composition comprising a crosslinked core component, one or more intermediate layer components and an outermost layer component in which the refractive index of each of the crosslinked core, the one or more intermediate layers and the outermost layer are within 2% of the refractive index of each adjacent component; wherein the crosslinked core component comprises from 75 to 99.9 weight percent of units derived from at least one first monomer selected from the group consisting of alkyl, aryl, and cycloalkyl (meth)acrylate monomer, optionally from 1 to 20 weight percent of units derived from a second monomer selected from the group consisting vinyl monomers; and from 0.1 to 5 weight percent of units derived from cross-linking monomers, graft-linking monomers, or combination thereof, and has a Tg of from −75 to −35° C.; wherein each of the one or more intermediate layer components comprises from 71 to 99.9 weight percent of units derived from a third monomer selected from the group consisting alkyl, aryl and cycloalkyl (meth)acrylate monomers, from 0 to 5 weight percent of units derived from a cross-linking monomer, graft-linking monomer, or combination thereof, optionally from 1 to 10 weight percent of units derived from one or more functional monomers, from 0 to 14 weight percent of vinyl monomers, and has a Tg of from −35 to 100° C.; and wherein the outermost layer component consists essentially of from 90 to 100 weight percent units derived from a fourth monomer selected from the group consisting of alkyl (meth)acrylate having from one to twelve carbon atoms, optionally from 0.5 to 10 weight percent of units derived from one or more functional monomers, and has a Tg of from 80 to 130° C. is provided. Films and polarizer plates made from the compositions are also provided.

EXAMPLES

The following examples illustrate the present invention but are not intended to limit the scope of the invention. Unless otherwise specified, all parts are by weight. The following abbreviations apply to all examples: BA is butyl acrylate; BzA is benzyl acrylate; BDA is butanediol diacrylate; ALMA is allyl methacrylate; MMA is methyl methacrylate; EA is ethyl acrylate; HEMA is 2-hydroxyethyl methacrylate; DDM is dodecyl mercaptan; St is styrene; n-DDM is n-dodecyl mercaptan.

Inventive Example 1

Preparation of a 4-Stage Polymer Having Distinct Intermediate Layer Compositions This example illustrates a four-stage polymer of the invention, the monomer composition is as follows: 3 wt % Seed Latex; 22 wt % Core formed from BA:BDA:ALMA:BzA (in a weight ratio of 74:1.0:0.5:24.5, calculated refractive index, (RI)=1.484, calculated Tg=−38° C.), 22 wt % Intermediate Layer Component formed from BA:MMA:ALMA (in a weight ratio of 39.5:60:0.5 Calculated RI=1.485, calculated Tg=12° C.), 26 wt % second intermediate layer formed from MMA:EA:DDM (in a weight ratio of 95.9:4:0.1, calculated RI=1.488, calculated Tg=98° C.). and 27 wt % Outer Layer formed from MMA:EA:HEMA:DDM (in a weight ratio of 93.9:2:4:0.1, calculated RI=1.487, calculated Tg=98° C.). All calculated Tg values are based on the Fox equation, T. G. Fox, *Bull. Am. Phys. Soc.*, 1, 123 (1956), incorporated herein by reference.

To a reactor equipped with stirrer, thermometer, nitrogen inlet, inlets for monomer addition, and reflux condenser, were charged 525 grams deionized water, 126 grams seed latex (preparation described below). This mixture was then sparged with nitrogen for 60 minutes at 72° C. At the end of the sparge period, 10 grams of a 2% solution of sodium persulfate was added to the reactor. 410 grams of the first-stage monomer mixture (prepared by combining 241 grams BA, 3.2 grams BDA, 1.5 grams ALMA, and 80 grams BzA, with 11 grams of a 25% solution of sodium dodecyl benzene sulfonate in 78 grams deionized water) was then added to the reactor over a 60 minute period with stirring at a rate of about 120 rpm. 30 grams of sodium persulfate polymerization initiator solution (preparation described above) was co-fed with the first stage monomer mixture to the reactor over a 60 minute period. During this addition time, the temperature of the reactor was maintained at 85° C. The first-stage polymerization was carried out to substantial completion by maintaining the reaction mixture at 85° C. for an additional 30 minutes.

The second stage was then added by charging to the reactor (which still contained the first-stage polymerization reaction product mixture) the second-stage monomer mixture (prepared by combining 129 grams MMA, 145 grams BA, 1.50 grams ALMA, 48.4 grams St, 4.7 grams sodium dodecyl benzene sulfonate and 67 grams deionized water and 30 grams polymerization initiator consisting of a 1% sodium persulfate solution) over a period of 60 minutes while maintaining the temperature at 85° C. The second-stage polymerization was carried out to substantial completion by maintaining the reaction mixture at 85° C. for an additional 30 minutes.

The stirring rate was then reduced to about 110 rpm and to the second-stage polymerization reaction product mixture a third-stage monomer mixture (prepared by combining 373 grams MMA, 16 grams EA, 0.3 grams n-DDM, 3 grams sodium dodecyl benzene sulfonate (24% in solution in water) and 58 grams polymerization initiator (2% solution of sodium persulfate)) was fed to the reactor during a period of 75 minutes while maintaining the temperature at 85° C. The third-stage polymerization was carried out to substantial completion by maintaining the reaction mixture at 85° C. for an additional 30 minutes.

The stirring rate was maintained at 110 rpm and to the third-stage polymerization reaction product mixture a fourth-stage monomer mixture (prepared by combining 373 grams MMA, 16 grams EA, 16 grams HEMA, 0.3 grams n-DDM, 3 grams sodium dodecyl benzene sulfonate (24% in solution in water) and 58 grams polymerization initiator (2% solution of sodium persulfate)) was fed to the reactor during a period of 75 minutes while maintaining the temperature at 85° C. The fourth-stage polymerization was carried out to substantial completion by maintaining the reaction mixture at 85° C. for an additional 30 minutes.

The resulting four-stage polymer latex was allowed to cool to room temperature and filtered through a 120 mesh screen. The product was characterized as having a solids level of 44.8% and a weight average molecular weight of the soluble portion=50,800 g/mole.

The seed latex was first prepared by adding 500 grams deionized water and 0.04 grams sodium hydroxide to a round bottom five liter glass reactor. The reactor was stirred at 130 rpm and heated to 70° C., while sparging with dry nitrogen for 30 minutes. 13 grams (49.74% solids) of sodium lauryl sulfonate, 0.05 grams sodium EDTA, and 0.03 grams iron sulfate heptahydrate were added to the reactor. The temperature was held at 70° C. A mixture of: (1) 237 grams butyl acrylate, 1.7 grams of allyl methacrylate, and (2) a solution of 0.4 grams of sodium persulfate in 20 grams water, was added to the reactor. After a peak temperature was observed, the peak temperature was held for about 10 minutes. The observed particle size of this latex was 55 nm and the solids content was 32%.

The latex was freeze dried with a vacuum oven, and the resultant powder was then milled using a Collin Mill (W. H. Collin GmbH Maschienefabrik, Aichach, Germany) at 175° C. for 3 minutes. After the milling was completed, the molten polymer was stripped from the metal rolls and placed in a metal mold to press into thin film sheets with a thickness in the range from 80 to 100 µm. The film possessed an L, a, b value of 96.56, −0.10, 0.62 (measured by Color Quest II, Hunter Lab, Reston, Va., USA), and a haze value of 0.62%.

Inventive Example 2

Preparation of a 4-Stage Polymer with the Intermediate Stage Having a Gradient Intermediate Layer Composition Typical staged emulsion polymerization processes produce polymer particles with very sharp transitions in molecular structures, i.e., abrupt compositional changes, distinct glass transition temperatures, and varying molecular weight distributions. Power feed polymerization process (described in U.S. Pat. No. 4,039,500, the disclosure of which is incorporated herein by reference, and in Bassett, et al., Nonuniform Emulsion Polymers, ACS Symp. Ser., 165, p. 371-387 (1981)) is a synthetic method which varies the feed rate of different monomers or chain transfer agents in order to achieve a latex particle containing a gradient of polymer composition. Polymer chains synthesized early in the polymerization will be richer in one component while those chains synthesized late in the polymerization will have a differing composition, in some instances, an inverse composition. Polymers made at intermediate times may have compositions and molecular weights closer to the statistical average. Physically, the compositional variation can have the effect of "smearing" the glass transition temperature into a broad spectrum, consistent with the Tg spectrum of the composition. Phase separation is typically avoided by the ability of the intermediate compositions to compatibilize those compositions which vary greatly from each other, generally those compositions made in the front and back ends of the process. The final compositional range is determined by, among other factors, the feed rate of the individual monomers.

Figure 4:
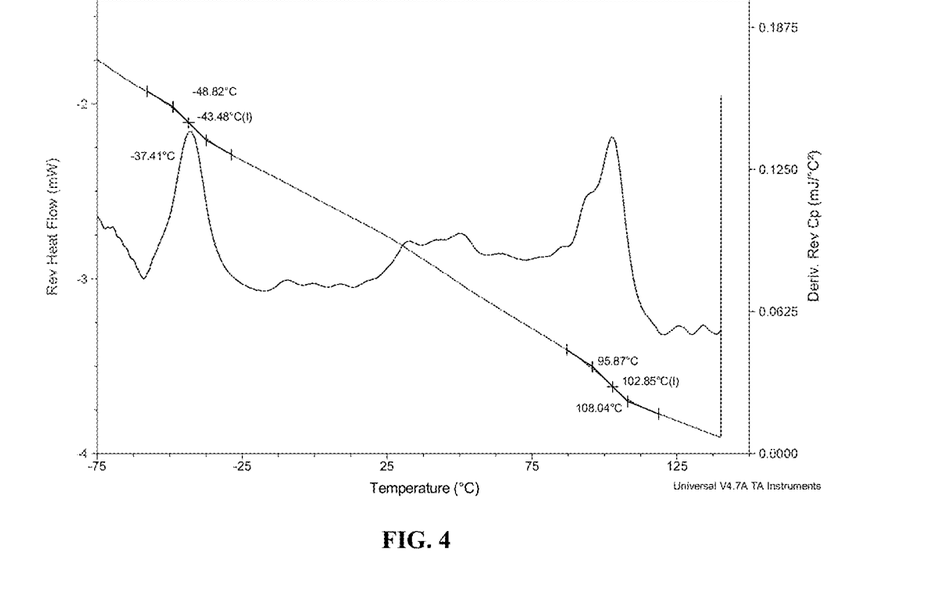
FIG. 4 is graph illustrating a representative differential scanning calorimetry determination of the glass transitions of an inventive multi-stage polymer composition wherein the intermediate layer components exhibit a gradient Tg.

The example described here and depicted in FIG. 4 shows the gradient composition with a broad Tg transition from about −20° C. to about 70° C.

In an alternative embodiment, an inventive multi-stage polymer composition having a gradient composition across the intermediate layer components may be achieved using an alternative configuration of the power feed polymerization method described above.

This example illustrates a four-stage polymer of the invention, the monomer composition is as follows: 3 wt % Seed Latex; 22 wt % of a Core formed from BA:BDA:ALMA:BzA (in a weight ratio of 74:1.0:0.5:24.5, calculated RI=1.482, calculated Tg=−38° C.), 35 wt % of an intermediate second gradient layer component with composition varying between that of BA:MMA:ALMA (in a weight ratio of 39.5:60:0.5, calculated Tg=12° C.) and MMA:EA:DDM (in a weight ratio of 95.9:4:0.1), with calculated RI's varying from 1.484 to 1.485, calculated Tg's=98° C., a 13 wt % of an third layer formed from MMA:EA:DDM (in a weight ratio of 95.9:4: 0.1; calculated RI=1.488). and 27 wt % of an outer layer formed from MMA:EA:HEMA:DDM (in a weight ratio of 93.9:4:2:0.1, calculated RI=1.487, calculated Tg=97° C.).

To a reactor equipped with stirrer, thermometer, nitrogen inlet, inlets for monomer addition, and reflux condenser, was charged 525 grams deionized water, 126 grams seed latex (preparation described in Example 1). This mixture was then sparged with nitrogen for 60 minutes at 72° C. At the end of the sparge period, 10 grams of a 2% solution of sodium persulfate was added to the reactor. 410 grams of the first-stage monomer mixture (prepared by combining 241 grams BA, 3.2 grams BDA, 1.5 grams ALMA, and 80 grams BzA, with 11 grams of a 25% solution of sodium dodecyl benzenesulfonate in 78 grams deionized water) was then added to the reactor over a 60 minute period with stirring at a rate of about 120 rpm. 30 grams polymerization initiator solution was co-fed with the first stage monomer mixture to the reactor over a 60 minute period. During this addition time, the temperature of the reactor was maintained at 85° C. The first-stage polymerization was carried out to substantial completion by maintaining the reaction mixture at 85° C. for an additional 30 minutes.

The second stage was then added by charging to the reactor (which still contained the first-stage polymerization reaction product mixture) the second-stage monomer mixture (prepared by combining 129 grams MMA, 145 grams BA, 1.50 grams ALMA, 48.4 grams St, 4.7 grams sodium dodecyl benzene sulfonate and 67 grams deionized water and 30 grams polymerization initiator consisting of a 1% sodium persulfate solution) over a period of 60 minutes while maintaining the temperature at 85° C. While the second stage was being added to the reactor, a mixture of the third-stage monomer mixture (prepared by combining 373 grams MMA, 16 grams EA, 0.3 grams n-DDM, 3 grams sodium dodecyl benzene sulfonate (24% in solution in water) and 58 grams polymerization initiator (2% solution of sodium persulfate)) was fed to the vessel containing the second stage reaction mixture, over a period of 120 minutes while maintaining the temperature at 85° C. The respective feed times of the second stage monomer and the third stage monomer mixtures may be varied to tailor the level of grafting. After the completion of the 100 minute feed of the third-stage minture, the polymerization was carried out to substantial completion by maintaining the reaction mixture at 85° C. for an additional 30 minutes.

The stirring rate was maintained at 110 rpm and to the third-stage polymerization reaction product mixture a fourth-stage monomer mixture (prepared by combining 373 grams MMA, 16 grams EA, 16 grams HEMA, 0.3 grams n-DDM, 3 grams sodium dodecyl benzene sulfonate (24% in solution in water) and 58 grams polymerization initiator (2% solution of sodium persulfate)) was fed to the reactor during a period of 75 minutes while maintaining the temperature at 85° C. The fourth-stage polymerization was carried out to substantial completion by maintaining the reaction mixture at 85° C. for an additional 30 minutes The resulting four-stage polymer latex was allowed to cool to room temperature and filtered through a 120 mesh screen. The product was characterized as having 42.8% solids and a weight average molecular weight of the soluble portion=32, 500 g/mole.

Inventive Example 3

Preparation of a 3-Stage Polymer Composition of the Invention and Film Therefrom This example illustrates a three-stage polymer of the invention, the monomer composition is as follows: 3 wt % Seed Latex; 24 wt % Core formed from BA:BDA:ALMA (in a weight ratio of 98.5:1.0:0.5, calculated refractive index, (RI) =1.461, calculated Tg=−54° C.), 24 wt % Intermediate Layer Component formed from BA:MMA:ALMA (in a weight ratio of 39.5:60:0.5, Calculated RI=1.485, calculated Tg=12° C.), and 49 wt % outer layer formed from MMA:EA:DDM (in a weight ratio of 95.6:4:0.4, Calculated RI=1.488, calculated Tg=98° C.).

To a reactor equipped with stirrer, thermometer, nitrogen inlet, inlets for monomer addition, and reflux condenser, was charged 1280 grams deionized water, 156 grams seed latex (preparation described in Inventive Example 1). This mixture was then sparged with nitrogen for 60 minutes at 83° C. At the end of the sparge period, 23 grams of a 0.3% solution of sodium persulfate was added to the reactor. 511 grams of the first-stage monomer mixture (prepared by combining 397 grams BA, 4 grams BDA, and 1.9 grams ALMA, with 14 grams of a 24% solution of sodium dodecyl benzene sulfonate in 95 grams deionized water) was then added to the reactor over a 60 minute period with stirring at a rate of about 125 rpm. 68 grams polymerization initiator solution was co-fed with the first stage monomer mixture to the reactor over a 60 minute period. During this addition time, the temperature of the reactor was maintained at 85° C. The first-stage polymerization was carried out to substantial completion by maintaining the reaction mixture at 85° C. for an additional 15 minutes.

The second stage was then added by charging to the reactor (which still contained the first-stage polymerization reaction product mixture) the second-stage monomer mixture (prepared by combining 238 grams MMA, 159 grams BA, 1.9 grams ALMA, 6 grams sodium dodecyl benzene sulfonate and 83 grams deionized water and 55 grams polymerization initiator consisting of a 0.4% sodium persulfate solution over a period of 60 minutes while maintaining the temperature at 85° C. The second-stage polymerization was carried out to substantial completion by maintaining the reaction mixture at 85° C. for an additional 15 minutes.

The stirring rate was then increased to about 130 rpm and to the second-stage polymerization reaction product mixture a third-stage monomer mixture (prepared by combining 761 grams MMA, 32 grams EA, 3.5 grams n-DDM, 6 grams sodium dodecyl benzene sulfonate (24% in solution in water) and 90 grams polymerization initiator (0.26% solution of sodium persulfate)) were fed to the reactor during a period of 180 minutes while maintaining the temperature at 85° C. The third-stage polymerization was carried out to substantial completion by maintaining the reaction mixture at 85° C. for an additional 30 minutes.

The resulting three-stage polymer latex was allowed to cool to room temperature and filtered through a 120 mesh screen. The product was characterized as having 42.5% solids and a weight average molecular weight of the soluble portion=88,100 g/mole.

The latex was isolated using a spray dryer and the resulting powder was then pelletized using a 30 mm twin screw extruder and 4 mm 2-strand die (Werner & Phleiderer, Ramsey, N.J.). The pelletizing conditions were as follows: temperature was 200° C., feed rate was 20 lbs/hour, and RPM was 150. The pellets were then processed into a thin film (~100 μm thick) using a single screw cast extrusion film line (Breyer GmbH, Singen, Germany) equipped with a 3 inch specialty screw (L/D=33) and a one meter wide die. The film possessed an L, a, b value of (by Color Quest II, Hunter Lab, Reston, Va., USA) 96.48, −0.12 1.09, and a haze value of 1.08%, and a birefringence of $\Delta$nd<3 nm. (at 632.8 nm wavelength by PEM −90, Hinds Instruments, Inc., Hillsboro, Oreg., USA).

Inventive Example 4

Preparation of a 4-Stage Polymer of the Invention and a Film Therefrom

This example illustrates a four-stage polymer of the invention, the monomer having a composition abbreviated as follows: 25 wt % of a Core formed from BA:BDA:ALMA (in a wt ratio of 98.5:1.0:0.5, calculated RI=1.461, calculated Tg=−54° C.); 25 wt % of a first intermediate layer formed from BA:MMA:ALMA (in a weight ratio of 39.5:60:0.5, calculated RI=1.483, calculated Tg=−12° C.); 25 wt % of a second intermediate layer formed from MMA:BA:n-DDM (in a weight ratio of 90:10:0.5, calculated RI=1.488, calculated Tg=75° C.); and 25 wt % of an outer layer formed from MMA:BA:n-DDM (in a weight ratio of 90:10:1.5, calculated RI=1.488, calculated Tg=75° C.).

To a reactor equipped with stirrer, thermometer, nitrogen inlet, inlets for monomer addition, and reflux condenser, were charged 7100 grams deionized water, 1.54 grams glacial acetic acid, and 15 grams dioctyl sodium sulfonate (70% in BA) and the mixture was sparged with the nitrogen for 60 minutes at 72° C. At the end of this sparge period, 270 grams of the first-stage monomer mixture (prepared by combining 2000 grams BA, 20 grams BDA, 10 grams ALMA, 15 grams dioctyl sodium sulfonate and 150 grams deionized water) was charged to the reactor, the stirring rate was adjusted to about 120 rpm, 4 grams polymerization initiator emulsion (prepared by combining 60 grams diisopropylbenzene hydroperoxide, 30 grams 10% solution of potassium dodecylbenzene sulfonate, and 1110 grams deionized water) and 120 grams 1% aqueous solution of sodium sulfoxylate formaldehyde were charged to the reactor. When the temperature of the resulting mixture began to increase and the color of the reaction mixture changes, an additional 30 grams polymerization initiator emulsion described above and the remainder of the first-stage monomer mixture were charged to the reactor during a period of 60 minutes while maintaining the temperature at 85° C. whereupon the first-stage polymerization was carried out to substantial completion by maintaining the reaction mixture at 85° C. for an additional 30 minutes. The second stage was then added by charging to the reactor, which contained the first-stage polymerization reaction product mixture, 200 grams 1% aqueous solution of sodium sulfoxylate for formaldehyde followed by the second-stage monomer mixture (prepared by combining 800 grams BA, 1200 grams MMA, 10 grams ALMA, 14 grams dioctyl sodium sulfonate (70% in BA) and 150 grams deionized water) and 30 grams polymerization initiator emulsion described above during a period of 60 minutes while maintaining the temperature at 85° C., whereupon the second-stage polymerization was carried out to substantial completion by maintaining the reaction mixture at 85° C. for an additional 30 minutes.

The stirring rate was increased to about 140 rpm and 200 grams 1% aqueous sodium sulfoxylate formaldehyde solution was charged to the reactor, which contained the second-stage polymerization reaction product mixture. Then the third-stage monomer mixture (prepared by combining 200 grams BA, 1800 grams MMA, 8 grams n-DDM, 13 grams dioctyl sodium sulfonate (70% in BA) and 150 grams dionized water) and 160 grams polymerization initiator emulsion described above were charged to the reactor during a period of 60 minutes while maintaining the temperature at 85° C., whereupon the third-stage polymerization was carried out to substantial completion by maintaining the reaction mixture at 85° C. for an additional 30 minutes.

The fourth stage was then added by charging to the reactor, which contained the third-stage polymerization reaction product mixture, 400 grams 1% aqueous sodium sulfoxylate formaldehyde solution followed by the fourth-stage monomer mixture (prepared by combining 180 grams BA, 1800 grams MMA, 20 grams n-DDM and 12 grams dioctyl sodium sulfonate (70% in BA)) and 320 grams polymerization initiator emulsion described above during a period of 60 minutes while maintaining the temperature at 85° C., whereupon the fourth-stage polymerization was carried out to substantial completion by maintaining the reaction mixture at 85° C. for an additional 30 minutes. The resulting four-stage polymer emulsion was allowed to cool to room temperature and had a weight average molecular weight of the soluble portion=100, 800 g/mole.

Figure 5:
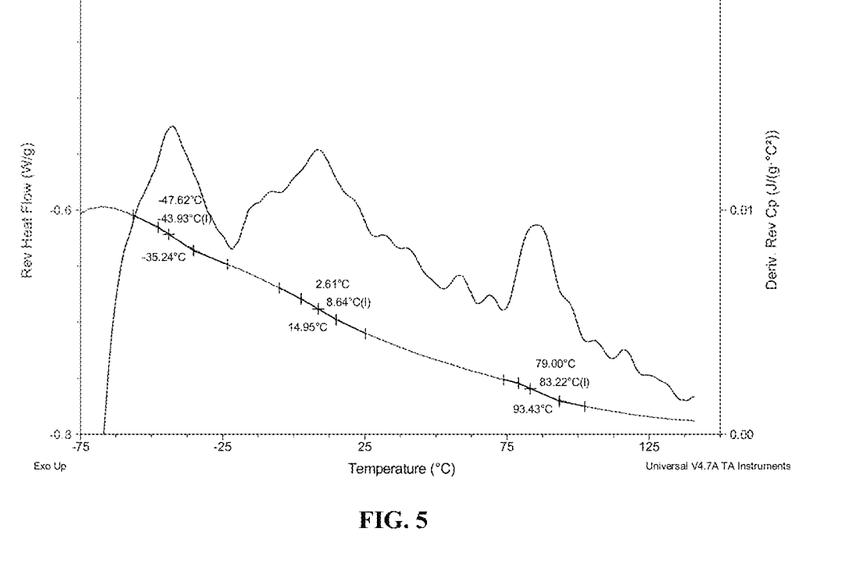
FIG. 5 is graph illustrating a representative differential scanning calorimetry determination of the glass transitions of an inventive multi-stage polymer composition wherein the intermediate layer components exhibit distinct Tgs.

The emulsion was then spray dried using a lab spray dryer (NIRO Inc., Soeborg, Denmark). The resultant powder was then milled using a Collin Mill (W. H. Collin GmbH Maschienefabrik, Aichach, Germany) at 175° C. for 3 minutes. After the milling was completed, the molten polymer was stripped from the metal rolls to obtain a thin film sheet with a thickness from ~150 μm. In the example described here, and depicted in FIG. 5, the DSC plot of the milled film exhibits a distinct Tg of 8.6° C. for the intermediate layer. The film possessed an L, a, b value of 96.97, −0.06, 0.47 (determined by Color Quest II, Hunter Lab, Reston, Va., USA); and a haze value of 1.26%.

TEST METHODS

Test methods include the following:

GPC Molecular Weight

The term "molecular weight" as used herein refers to peak average molecular weight as determined by gel permeation chromatography (GPC) against narrow molecular weight polystyrene standards in tetrahydrofuran solvent at 25° C. using Polymer Laboratories data manipulation software.

Particle Size

The volume average particle size was measured on very dilute latexes (diluted to 0.001% solids) with a BI 90 (Brookhaven Instruments, Holtsville, N.Y.) particle size detector, utilizing Dynamic Light Scattering (15° and 90° scattering angles) and a laser light source. The signal is detected by a photodiode array and the data analyzed with a built in correlator. The volume average particle sizes of the resulting latexes were measured to be in the range of 125-300 nm.

Differential Scanning Calorimetry (DSC)

The glass transition temperature (Tg) was measured using a differential scanning calorimetry (DSC) from TA Instruments (New Castle, Del., USA). Samples were tested in an aluminum pan under $N_2$ under a rate of 20° C./min.

Haze Level

Haze level of films was measured in accordance with ASTM 871-96 (2010).

Film Thickness

The thickness of the films was measured using a micrometer.

In-Plane Retardation and Thickness Direction Retardation

The retardance of light at 632.8 nm wavelength was determined using PEM –90 (Hinds Instruments, Inc., Hillsboro, Oreg., USA). The retardance was determined by comparing the maximum signal to that measured for a standard ¼ wave plate.

The present invention may be embodied in other forms without departing from the spirit and the essential attributes thereof, and, accordingly, reference should be made to the appended claims, rather than to the foregoing specification, as indicating the scope of the invention.

We claim:

1. A multi-stage polymer composition comprising:
a crosslinked core component, one or more intermediate layer components and an outermost layer component in which the refractive index of each of the crosslinked core, the one or more intermediate layers and the outermost layer are within 2% of the refractive index of each adjacent component;
wherein the crosslinked core component comprises from 75 to 99.9 weight percent of units derived from at least one first monomer selected from the group consisting of alkyl, aryl, and cycloalkyl (meth)acrylate monomer, optionally from 1 to 20 weight percent of units derived from a second monomer selected from the group consisting vinyl monomers; and from 0.1 to 5 weight percent of units derived from cross-linking monomers, graft-linking monomers, or combination thereof, and has a Tg of from –75 to –35° C.;
wherein each of the one or more intermediate layer components comprises from 71 to 99.9 weight percent of units derived from a third monomer selected from the group consisting alkyl, aryl and cycloalkyl (meth)acrylate monomers, from 0 to 5 weight percent of units derived from a cross-linking monomer, graft-linking monomer, or combination thereof, optionally from 1 to 10 weight percent of units derived from one or more functional monomers, from 0 to 14 weight percent of vinyl monomers, and has a Tg of from –35 to 100° C.; and
wherein the outermost layer component comprises from 90 to 100 weight percent units derived from a fourth monomer selected from the group consisting of alkyl (meth) acrylate having from one to twelve carbon atoms, optionally from 0.5 to 10 weight percent of units derived from one or more functional monomers, and has a Tg of from 80 to 130° C.; and
wherein the multi-stage polymer composition comprises from 10 to 30 percent by weight of the crosslinked core component, from 10 to 30 percent by weight of the total amount of the one or more intermediate layer components, and from 40 to 80 percent by weight of the outermost layer component, based on the total weight of the multi-stage polymer.

2. The multi-stage polymer composition according to claim 1, wherein each of the crosslinked core component, the one or more intermediate layer components, and the outermost layer component have a refractive index in the range from 1.46 to 1.53.

3. The multi-stage polymer composition according to claim 1, wherein the first monomer is selected from the group consisting of butyl acrylate, ethyl hexyl acrylate, ethyl acrylate, methyl methacrylate, cyclohexyl methacrylate, cyclopentyl methacrylate, benzyl acrylate, benzyl methacrylate, phenyl acrylate, and phenyl methacrylate.

4. The multi-stage polymer composition according to claim 1, wherein the cross-linking monomer is selected from the group consisting of butanediol di(meth)acrylate, diethylene glycol di(meth)acrylate, trimethyolpropane trimethacrylate, ethylene glycol di(meth)acrylate, divinyl benzene, and combinations thereof.

5. The multi-stage polymer composition according to claim 1, wherein the graft-linking monomer is selected from the group consisting of allyl methacrylate, diallyl maleate, and combinations thereof.

6. The multi-stage polymer composition according to claim 1, wherein the outermost layer component has a weight average molecular weight less than 500,000 g/mole.

7. The multi-stage polymer composition according to claim 1, wherein the functional monomers comprise functional groups selected from the group consisting of acid, amino, oxirane, glycidyl, and hydroxyl functional groups.

8. The multi-stage polymer composition according to claim 1, wherein one or more of the intermediate layer components have a distinct composition such that each intermediate layer has a distinct Tg transition from –30° C. and 60° C.

9. A film comprising one or more multi-stage polymer compositions according to claim 1, wherein the film exhibits in-plane retardation, Δnd, of less than 3 nm and a thickness direction retardation, Rth, of less than 50 nm.

10. The film according to claim 9, wherein the film has a thickness of from 60 to 80 microns.

11. The film according to claim 9, wherein the film has a haze level of less than 1.5% as measured according to ASTM D871-96(2010).

12. A polarizer protective film comprising the multi-stage polymer composition according to claim 1.

13. A polarizer plate comprising the film according to claim 11.

* * * * *